United States Patent
Hwang et al.

(10) Patent No.: US 8,951,622 B2
(45) Date of Patent: Feb. 10, 2015

(54) VACUUM INSULATION MEMBER, REGISTRATOR HAVING VACUUM INSULATION MEMBER, AND METHOD FOR FABRICATING VACUUM INSULATION MEMBER

(75) Inventors: Minkyu Hwang, Changwon-si (KR); Dongju Jung, Changwon-si (KR); Ilseob Yoon, Changwon-si (KR); Jinwoo Shim, Changwon-si (KR); Kyungdo Kim, Changwon-si (KR); Youngbae Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 13/386,970

(22) PCT Filed: Aug. 6, 2010

(86) PCT No.: PCT/KR2010/005175
§ 371 (c)(1),
(2), (4) Date: Jan. 25, 2012

(87) PCT Pub. No.: WO2011/016695
PCT Pub. Date: Feb. 10, 2011

(65) Prior Publication Data
US 2012/0132659 A1    May 31, 2012

(30) Foreign Application Priority Data
Aug. 7, 2009 (KR) .......................... 10-2009-0072994

(51) Int. Cl.
*F16L 59/065* (2006.01)
(52) U.S. Cl.
CPC ........... *F16L 59/065* (2013.01); *F25D 2201/14* (2013.01)
USPC ........................................................... 428/69
(58) Field of Classification Search
CPC ............................... F16L 59/065; E04B 1/803
USPC ........ 428/69; 220/610, 611, 612, 613, 592.27
See application file for complete search history.

(56) References Cited

U.S. PATENT DOCUMENTS

| 3,381,842 A | * | 5/1968 | Vayson | 220/2.1 R |
| 4,791,773 A | * | 12/1988 | Taylor | 52/786.13 |
| 2002/0114937 A1 | * | 8/2002 | Albert et al. | 428/304.4 |

FOREIGN PATENT DOCUMENTS

| JP | 2002-257288 A | 9/2002 |
| JP | 2004-011705 A | 1/2004 |
| JP | 2006-002920 A | 1/2006 |
| KR | 10-0664279 B1 | 1/2007 |

OTHER PUBLICATIONS

International Search Report and Written Opinion dated Mar. 18, 2011 issued in Application No. PCT/KR2010/005175.

* cited by examiner

*Primary Examiner* — Alexander Thomas
(74) *Attorney, Agent, or Firm* — Ked & Associates, LLP

(57) ABSTRACT

Disclosed are a vacuum insulation member, a refrigerator having the vacuum insulation member, and a method for fabricating the vacuum insulation member. The vacuum insulation member includes: a core having a certain shape and having a decompressed space therein; and a gas barrier layer formed by coating a certain material on a surface of the core to have impermeability. Accordingly, the use of an envelope (film) can be avoided to obtain reliability, and the use of a glass fiber core which must undergo a preprocessing process for which much equipment and time are required can be avoided.

16 Claims, 6 Drawing Sheets

VACUUM INSULATION MEMBER, REGISTRATOR HAVING VACUUM INSULATION MEMBER, AND METHOD FOR FABRICATING VACUUM INSULATION MEMBER

TECHNICAL FIELD

The present invention relates to a vacuum insulation member, a refrigerator having a vacuum insulation member, and a method for fabricating a vacuum insulation member, and more particularly, to a vacuum insulation member embedded in a wall body of a refrigerator, a refrigerator having a vacuum insulation member, and a method for fabricating a vacuum insulation member.

BACKGROUND ART

In general, a vacuum insulation member is a sort of insulator decompresses an internal s pace into a vacuum state to thus use the characteristics of low thermal conductivity of vacuum. The vacuum insulation member may be implemented in the form of a panel having a certain thickness.

The vacuum insulation panel may be configured to include an envelope forming a certain space therein and a core accommodated at an inner side of the envelope and supporting such that the envelope to maintain the certain space. In addition, a getter for absorbing an internal gas of the envelope may be provided at the inner side of the envelope.

The envelope (e.g., a film), serving to maintain an internal vacuum degree of the vacuum insulation member at a certain level, is formed of a film formed by laminating multi-layered polymers and aluminum, or the like.

As the core, glass fiber, silica core, or the like, is used. Among them, glass fiber is commonly used because its excellent initial performance is excellent and its cost is low. However, glass fiber needs a preprocessing and has weak durability.

The getter is a sort of aspirator or an absorbent for absorbing gas and/or moisture which is present at the inner side of the envelope or newly introduced.

DISCLOSURE OF INVENTION

Technical Problem

In the related art vacuum insulation member, however, an film having impermeability is used as the envelope in order to make the interior of the vacuum insulation member vacuumized. So the film, which is not enough strong, may be damaged by an external force when used, shortening the life span.

In addition, because the core is formed of glass fiber, it is not easy to handle the core, and in order to insert the core into the interior of the envelope, the core needs to undergo a preprocessing process (e.g., hot pressing or needle punching) in order to reduce the volume and size of the core. This results in problems in that the cost increases, much time is required, and the productivity is degraded.

Also, in the case of the vacuum insulation member using the glass fiber core, in a state that the interior of the envelope is vacuumized, the deviation of thickness of the vacuum insulation member is so large that the thickness of the vacuum insulation member is not uniform. Thus, due to such a problem, the thickness of an insulation wall of a refrigerator using the same is set and formed based on the thinnest thickness of the vacuum insulation member when designing the refrigerator. This, however, causes a problem in that the thickness of the entire insulation wall increases overall.

In addition, in the case of the vacuum insulation member using the glass fiber core, after the vacuum insulation panel is fabricated, the surface of the envelope is creased to be non-uniform. Thus, when the vacuum insulation member using the glass fiber core is attached to an object, a blowing agent could be possibly introduced to the gap due to the creases of the envelope and expanded to cause the vacuum insulation member to be separated. Namely, the defective attachment (or defective bonding) is caused.

Solution to Problem

Therefore, in order to address the above matters, the various features described herein have been conceived.

An aspect of the present invention provides a vacuum insulation member having reliability without using a film, a refrigerator having the vacuum insulation member, and a method for fabricating the vacuum insulation member.

Another aspect of the present invention provides a vacuum insulation member formed without using glass fiber core, a refrigerator having the vacuum insulation member, and a method for fabricating the vacuum insulation member.

Another aspect of the present invention provides a vacuum insulation member formed to have a uniform thickness, a refrigerator having the vacuum insulation member, and a method for fabricating the vacuum insulation member.

Another aspect of the present invention provides a vacuum insulation member in which a generation of creases on an outer surface can be restrained and a defective bonding can be reduced, a refrigerator having the vacuum insulation member, and a method for fabricating the vacuum insulation member.

According to an aspect of the present invention, there is provided a vacuum insulation member including: a core having a certain shape and having a decompressed space therein; and a gas barrier layer formed by coating a certain material on a surface of the core to have impermeability.

Here, a vacuum degree of the interior of the core may range from $10^{-5}$ Torr to $10^{-2}$ Torr.

The material of the gas barrier layer may be metal. Namely, the gas barrier layer may be configured by laminating metal (e.g., aluminum) on the surface of the core with a certain thickness.

The vacuum insulation member may further include: a filler formed as powder having micro pores and charged in the interior of the core.

A vacuum degree of the interior of the core may range from $10^{-1}$ Torr to 10 Torr.

In this case, the material of the gas barrier layer may be a metal or inorganic material. Here, the inorganic material may include at least one of silicon dioxide, titanium dioxide, and aluminum oxide. Namely, metal or an inorganic material may be deposited with a certain thickness on the surface of the core.

The filler may be configured to include at least one of silicon dioxide, titanium dioxide, and aluminum oxide.

The filler may be configured to include at least one of aerogel and fumed silica.

The core may be configured to have the shape of a rectangular parallelepiped.

The vacuum insulation member may further include a getter disposed at an inner side of the core and absorbing a gas component.

Ribs may be provided to be disposed in a thicknesswise direction of the core at the inner side of the core.

A through portion may be formed on the ribs in order to restrain heat transmission.

Another aspect of the present invention provides a refrigerator having the vacuum insulation member.

Another aspect of the present invention provides a method for fabricating a vacuum insulation member, including: forming a core having a certain shape and having a vacuum space therein; forming a gas barrier layer by coating a certain material on a surface of the core; and decompressing the interior of the core to maintain a certain vacuum degree.

Another aspect of the present invention provides a method for fabricating a vacuum insulation member, including: forming a core having a certain shape and having a vacuum space therein; forming a gas barrier layer by coating a certain material on a surface of the core; inserting a filler as powder having micro pores into the interior of the core; and decompressing the interior of the core to maintain a certain vacuum degree.

Advantageous Effects of Invention

According to exemplary embodiments of the present invention, because the gas barrier layer is formed on the outer surface of the core having a certain shape and forming an empty space formed therein, the use of an envelope configured as a film can be avoided. Thus, damage to the vacuum insulation member can be prevented to improve reliability.

Also, because the gas barrier layer is formed on the outer surface of the core having a certain shape and forming an empty space formed therein, the use of a glass fiber core which needs to undergo a preprocessing process for which much equipment and time are required can be avoided. Thus, the fabrication can be facilitated and the fabrication cost can be reduced.

In addition, because the gas barrier layer is formed on the outer surface of the core having a certain shape and forming an empty space formed therein, the thickness of the completed vacuum insulation member can be uniform. Accordingly, a uniform insulation performance can be obtained and the thickness of an insulation wall including the vacuum insulation member can be reduced overall.

In addition, because the use of an envelope is omitted, there is no possibility that creases on an outer surface cannot be generated after the interior is vacuumized. Thus, the surface of the vacuum insulation member can be smoothed, thus considerably reducing a generation of a defective bonding that the vacuum insulation member is separated from a surface of an object resulting from its expansion according to an introduction of a blowing agent into a gap between creases of the envelope.

In addition, because the gas barrier layer is formed on the outer surface of the core having a certain shape and forming an empty space formed therein and the filler as powder having micro pores is provided at the inner side of the core, a relatively low internal vacuum degree can be maintained. Accordingly, much equipment or time are not required to maintain a high vacuum degree, and thus, the fabrication cost can be reduced and the fabrication can be quickly and easily performed.

The foregoing and other objects, features, aspects and advantages of the present invention will become more apparent from the following detailed description of the present invention when taken in conjunction with the accompanying drawings.

BEST MODE FOR CARRYING OUT THE INVENTION

Exemplary embodiments of the present invention will now be described in detail with reference to the accompanying drawings.

Figure 1:
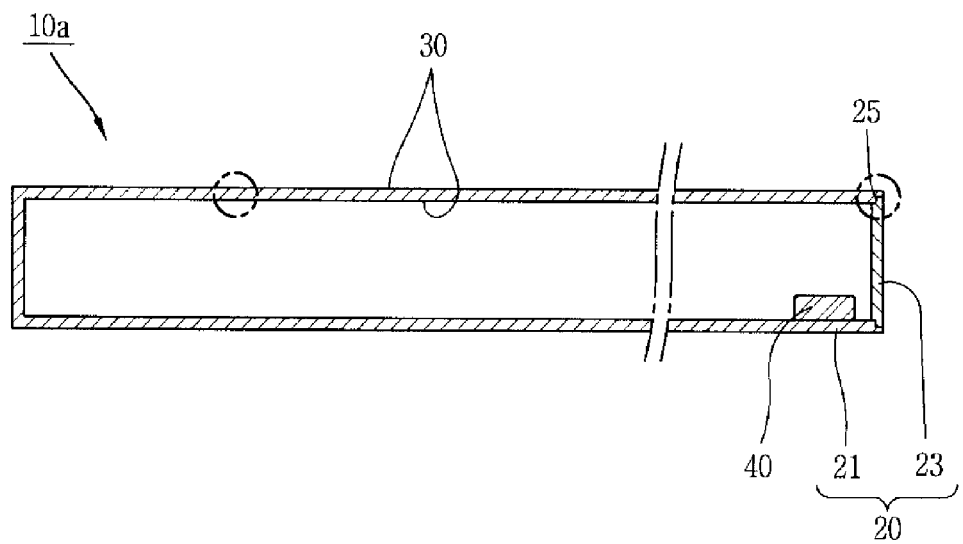
FIG. 1 is a sectional view showing a vacuum insulation member having a core according to a first exemplary embodiment of the present invention.
Figure 2:
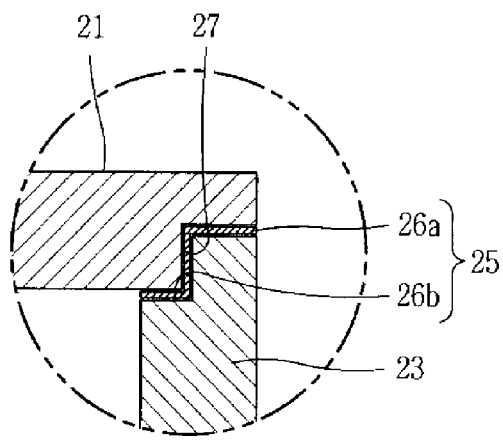
FIG. 2 is an enlarged view showing a step region of FIG. 1.
Figure 3:
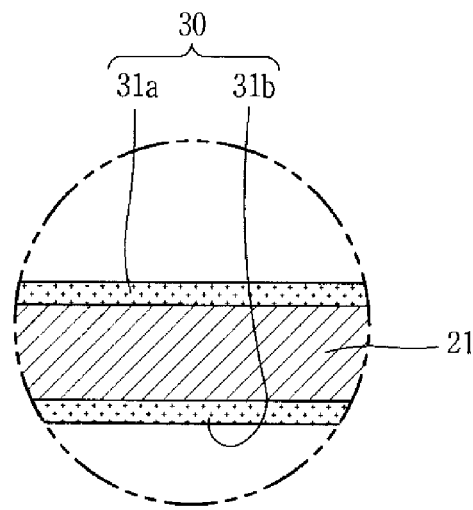
FIG. 3 is a view illustrating a gas barrier layer of FIG. 1.

FIG. 1 is sectional view showing a vacuum insulation member having a core according to a first exemplary embodiment of the present invention, FIG. 2 is an enlarged view showing a step region of FIG. 1, and FIG. 3 is a view illustrating a gas barrier layer of FIG. 1.

As shown in FIG. 1, a vacuum insulation member 10a according to the present exemplary embodiment includes a core 20 having a certain shape and having a decompressed space therein; and a gas barrier layer 30 formed by coating a certain material on a surface of the core to have impermeability. Here, the decompressed space refers to a space having an internal pressure lower than atmospheric pressure.

The core 20 may be configured to have the shape of a rectangular parallelepiped with an empty space formed therein. Thus, the use of a glass fiber core can be avoided, and thus, a preprocessing (e.g., hot pressing or needle punching, and the like), for which much equipment and much time are required, is not necessarily performed to reduce the size and volume of the glass fiber core resulting from the use of the glass fiber core.

Also, because the deviation of the height (thickness) of the core 20 can be reduced, a uniform insulation thickness of the vacuum insulation member 10a can be obtained. Namely, when the related art glass fiber core is used, after an internal space of an envelope is decompressed (vacuumized), the thickness of the vacuum insulation member is greatly changed (about 30 percent), while there is little change in the thickness of the vacuum insulation member 10a according to the present exemplary embodiment, obtaining the uniform thickness.

The core 20 may be made of a synthetic resin material.

The core 20 may include a body 21 having the shape of a rectangular parallelepiped, which has one side open and an empty space formed therein, and a cover 23 for opening and closing the opening of the body 21.

A step portion 25 may be formed at an area where the body 21 and the cover 23 are in contact with each other. Accordingly, a mutual contact surface can be increased to increase air-tightness. A sealing member 27 may be interposed between a step portion 26a of the body 21 and a step portion 26b of the cover 23 in order to air-tightly maintain the interior and the exterior. Accordingly, the air-tightness can be further increased to easily maintain the internal vacuum state.

Meanwhile, the gas barrier layer 30 may be formed by coating a certain material on the surface of the core 20 to have impermeability. Accordingly, the use of an envelope formed as a film (synthetic resin member) can be avoided. Thus, because there is no possibility that internal vacuum is damaged due to a broken or damaged envelope, the life span of the vacuum insulation member can be extended. Also, a defective attachment resulting from creases of the envelope can be prevented.

In the present exemplary embodiment, the case in which an outer barrier layer 31a and an inner barrier layer 31b are provide on an inner surface and an outer surface of the core, respectively, is illustrated.

An internal vacuum degree of the core 200 may range from $10^{-5}$ Torr to $10^{-2}$ Torr.

In this case, the gas barrier layer 30 may be made of metal (e.g., aluminum) to maintain a high vacuum degree. The gas barrier layer 30 may be formed by coating an inorganic material (e.g., silica).

The core 20 may include a getter 40 to absorb a gas. The getter 40 may include CaO or zeolite as an absorbent. Also, the getter 40 may be configured to include at least one of BaLi, CoO, BaO, and CaO in order to absorb oxygen, hydrogen, nitrogen, carbon dioxide, and vapor. Here, the getter 40 may be configured to have the shape of a certain block or a rectangular parallelepiped. Also, the getter 40 may be coated on an inner surface of the envelope or the surface of the core 20.

With such a configuration, when the core 20 is formed, a certain material may be coated on the outer surface of the core 20 to form the gas barrier layer 30. The getter 40 is inserted into the interior of the core 20. And then, the interior of the core 20 is decompressed to maintain a certain vacuum degree and then hermetically sealed.

Figure 4:
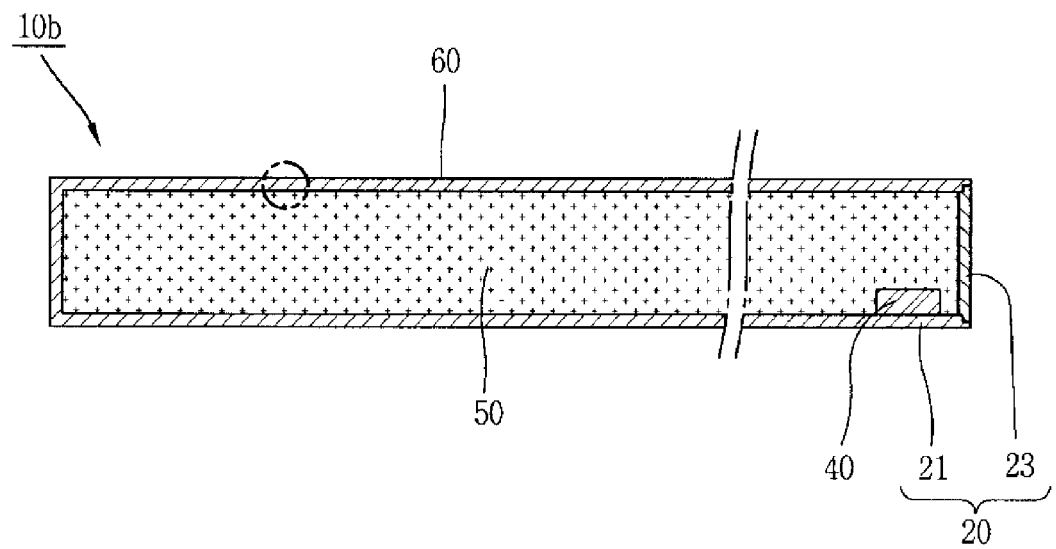
FIG. 4 is a sectional view showing a vacuum insulation member having a core according to a second exemplary embodiment of the present invention.
Figure 5:
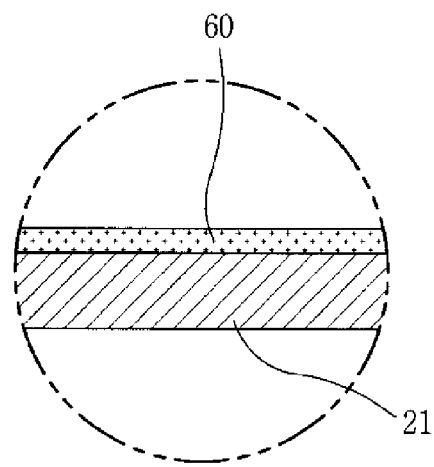
FIG. 5 is a view illustrating a gas barrier layer of FIG. 4.

FIG. 4 is a sectional view showing a vacuum insulation member having a core according to a second exemplary embodiment of the present invention, and FIG. 5 is a view illustrating a gas barrier layer of FIG. 4.

The same reference numerals are used for the same and equivalent parts of the foregoing configurations for the sake of explanation of the drawings, and a repeated description of some elements will be omitted.

As shown in FIG. 4, a vacuum insulation member 10b according to the present exemplary embodiment includes a core 20 having a certain shape and having a decompressed space therein; and a gas barrier layer 60 formed by coating a certain material on a surface of the core to have impermeability.

The core 20 may be configured to have the shape of a rectangular parallelepiped with an empty space formed therein. Thus, the use of a glass fiber core can be avoided. Also, because the deviation of the height (thickness) of the core 20 can be reduced, a uniform insulation thickness of the vacuum insulation member 10a can be obtained.

The core 20 may be made of a synthetic resin material. The core 20 may include a body 21 having the shape of a rectangular parallelepiped, which has one side open and an empty space formed therein, and a cover 23 for opening and closing the opening of the body 21. A step portion 25 may be formed at an area where the body 21 and the cover 23 are in contact with each other. A sealing member 27 may be interposed at the step portion 25 for hermetical sealing.

The core 20 may include a getter 40 in order to absorb a gas. The getter 40 may be configured to have the shape of a certain block or a rectangular parallelepiped, or may be coated on an inner surface of the core 20 or attached to the inner surface of the core 20.

Meanwhile, a filler 50 formed as powder having micro pores may be provided at the inner side of the core 20. Accordingly, radiation of the internal space of the core 20 and/or a heat transmission by convection can be restrained.

The filler 50 may be configured to include at least one inorganic materials, for example, silicon dioxide ($SiO_2$), titanium dioxide ($TiO_2$), or aluminum oxide (alumina, $AlO_3$). The filler 50 may be configured to include at least one of aerogel and fumed silica.

Namely, because the internal space of the core 20 is filled with the filler 50 formed as inorganic compound powder, a heat transmission path by conduction can be lengthened and a heat transmission by convection or radiation can be restrained.

An internal vacuum degree of the envelope may be configured to be maintained at $10^{-1}$ Torr to 10 Torr.

Accordingly, when the interior of the core 20 is vacuumized, need for the equipment (vacuum pump, and the like) can be reduced and a tact time can be considerably reduced.

In detail, in order to make the interior of the core 20 have the vacuum degree of $10^{-2}$ Torr or lower ($10^{-4}$ Torr to $10^{-2}$ Torr), a very large pumping capacity is required, for which at least three pumps must be connected in series (or by stages). In this case, some of the pumps have a large capacity and are high-priced, and a tact time required for reaching a vacuum degree of a desired level is considerably lengthened, degrading the productivity. In comparison, in the present exemplary embodiment, in order to maintain the vacuum degree of $10^{-2}$ Torr or higher ($10^{-1}$ Torr to 10 Torr) in the interior of the vacuum insulation material 10b, a high capacity, high-priced pump is not required and the vacuum degree of a desired level can be reached within a relatively short time.

Meanwhile, as shown in FIG. 5, the gas barrier layer 60 can be formed on the surface of the core 20. In more detail, the gas barrier layer 60 may be formed on the outer surface of the core 20. Thus, the use of an envelope made of a film can be avoided. Thus, because there is no possibility that internal vacuum is damaged due to a broken or damaged envelope, the life span of the vacuum insulation member can be extended. Here, the gas barrier layer 60 may be formed on both of the inner surface and outer surface of the core 20.

The gas barrier layer 60 may be formed by depositing (or coating) an inorganic material. Accordingly, because the gas barrier layer 60 is made of an inorganic material that can restrain a heat transmission, a heat transmission through the gas barrier layer 60 can be restrained. The gas barrier layer 60 may be formed to have a very small thickness through the deposition, compared with a metal laminated layer formed by laminating metal. Thus, although the gas barrier layer 60 is formed by depositing metal, a heat transmission can be further restrained.

Here, as the coating method, deep coating, spraying, and the like, may be used.

The inorganic material of the gas barrier layer 60 may include at least one of silicon dioxide, titanium dioxide, and aluminum oxide.

With such a configuration, when the core 20 is formed, a certain material can be coated on the outer surface of the core 20 to form the gas barrier layer 60. The filler 50 and the getter 40 are inserted into the interior of the core 20. And then, the interior of the core 20 is decompressed to maintain a certain vacuum degree in the interior of the core 20 and then hermetically sealed.

Figure 6:
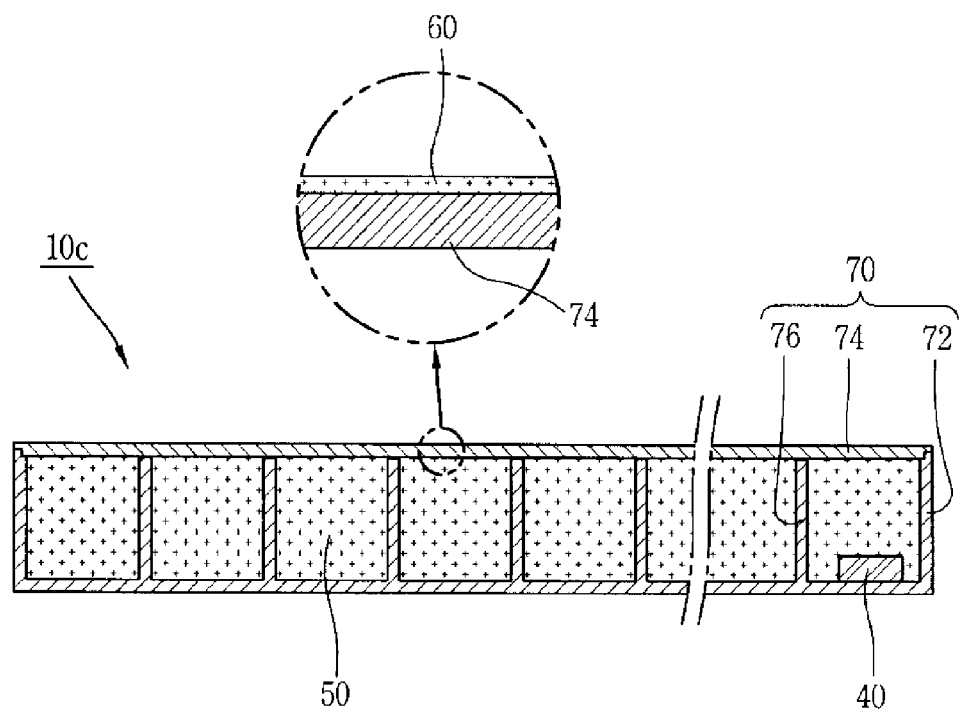
FIG. 6 is a sectional view showing a vacuum insulation member having a core according to a third exemplary embodiment of the present invention.
Figure 7:
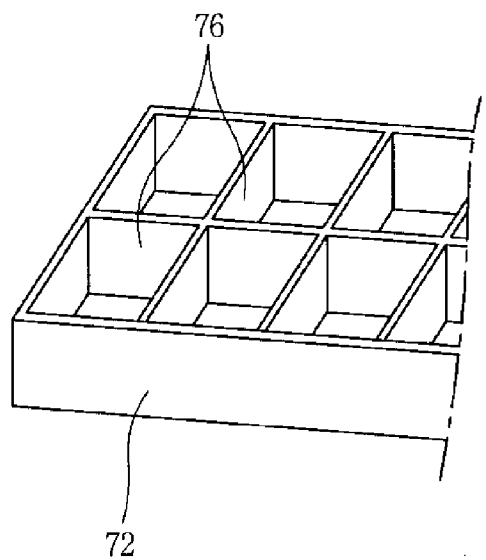
FIG. 7 is a partial perspective view of ribs of FIG. 6.
Figure 8:
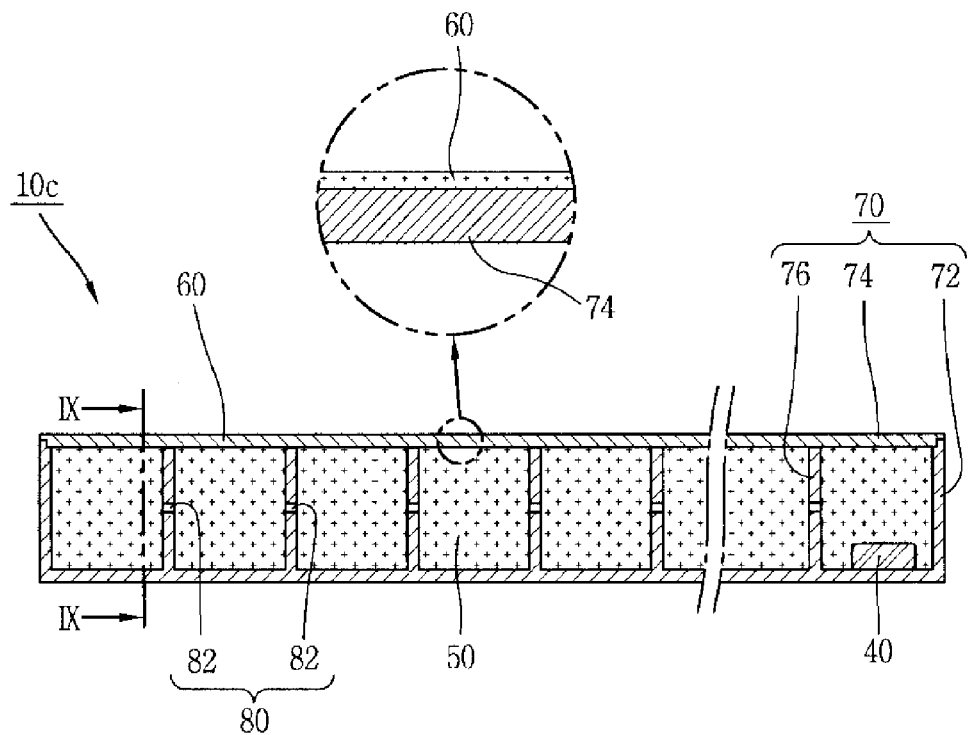
FIG. 8 is a sectional view showing a vacuum insulation member having a core according to a fourth exemplary embodiment of the present invention.
Figure 9:
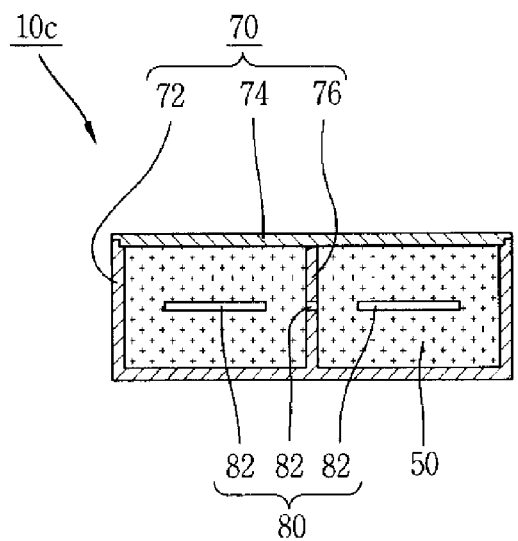
FIG. 9 is a sectional view taken along line IX-IX of FIG. 8.
Figure 10:
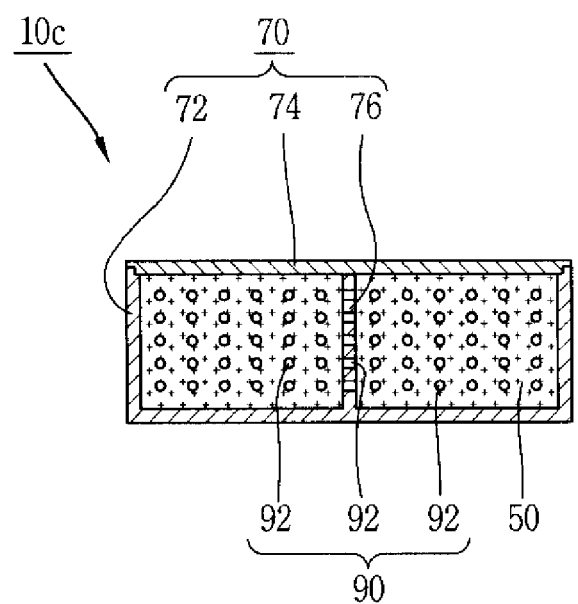
FIG. 10 is a variant of a through portion of FIG. 9.

FIG. 6 is a sectional view showing a vacuum insulation member having a core according to a third exemplary embodiment of the present invention, FIG. 7 is a partial perspective view of ribs of FIG. 6, FIG. 8 is a sectional view showing a vacuum insulation member having a core according to a fourth exemplary embodiment of the present invention, FIG. 9 is a sectional view taken along line IX-IX of FIG. 8, and FIG. 10 is a variant of a through portion of FIG. 9.

As shown in FIGS. 6 to 8, a vacuum insulation member 10c according to the present exemplary embodiment includes a core 70 having a certain shape and having a decompressed space therein; and a gas barrier layer 60 formed by coating a certain material on a surface of the core to have impermeability.

The core 70 may be configured to have the shape of a rectangular parallelepiped with an empty space formed therein.

Thus, the use of a glass fiber core can be avoided. Also, the deviation of the height (thickness) of the core 70 can be reduced.

The core 70 may be made of a synthetic resin material. The core 70 may include a body 72 having the shape of a rectangular parallelepiped, which has one side open and an empty space formed therein, and a cover 74 for opening and closing the opening of the body 71. A step portion may be formed at an area where the body 72 and the cover 74 are in contact with each other. A sealing member may be interposed at the step portion for hermetical sealing. The core 70 may include a getter 40 in order to absorb a gas component. Meanwhile, the filler 50 formed as powder having micro pores may be provided at the inner side of the core 70. Accordingly, radiation of the internal space of the core 70 and/or a heat transmission by convection can be restrained. The filler 50 may be configured to include at least one of silicon dioxide ($SiO_2$), titanium dioxide ($TiO_2$), or aluminum oxide (alumina, $AlO_3$). The filler 50 may be configured to include at least one of aerogel and fumed silica.

The gas barrier layer 60 may be configured to have relatively low impermeability. An internal vacuum degree of the envelope may be configured to be maintained at $10^{-1}$ Torr to 10 Torr. Accordingly, when the interior of the core 70 is vacuumized, introduction of equipment (vacuum pump, and the like) can be reduced and a tact time can be considerably reduced.

The gas barrier layer 60 can be formed on the surface of the core 70. In more detail, the gas barrier layer 60 may be formed on the outer surface of the core 70. Thus, the use of an envelope configured as a film can be avoided.

The gas barrier layer 60 may be formed by depositing (or coating) an inorganic material (e.g., silicon dioxide, titanium dioxide, aluminum oxide, and the like). Accordingly, because the gas barrier layer 60 is made of an inorganic material that can restrain a heat transmission, a heat transmission through the gas barrier layer 60 can be more effectively restrained.

Meanwhile, ribs 76 may be disposed along a thicknesswise (heightwise) direction of the core 70 at the inner side of the core 70. Thus, a change in the thicknesswise direction of the core 70 can be restraining to secure a uniform support strength.

One end (i.e., a lower end) of each of the ribs 76 may be in contact with a lower surface of the core 70, and the other end (i.e., an upper end) of each of the ribs 76 may be in contact with the cover 74. As shown in FIG. 7, the ribs 76 may be configured to be disposed to be perpendicular to each other. Accordingly, the internal space can be demarcated to be smaller, obtaining a uniform support strength.

Meanwhile, through portions 80 may be formed on the ribs 76. Thus, a heat transmission in the thicknesswise (heightwise) direction of the core 70 through the ribs 76 can be restrained.

The through portions 80 may be formed as slits 82 each having a length longer than its width. Here, the length, width, and number of the slits 82, namely, the through portions 80, may be appropriately adjusted.

Also, as shown in FIG. 10, through portions 90 may be formed to have a plurality of through holes 92. Here, the through holes 92 may have an oval shape or a polygonal shape. The size, shape, and number of the through holes 92 may be appropriately adjusted.

A refrigerator having a vacuum insulation member according to an exemplary embodiment of the present invention will now be described with reference to FIG. 11.

Figure 11:
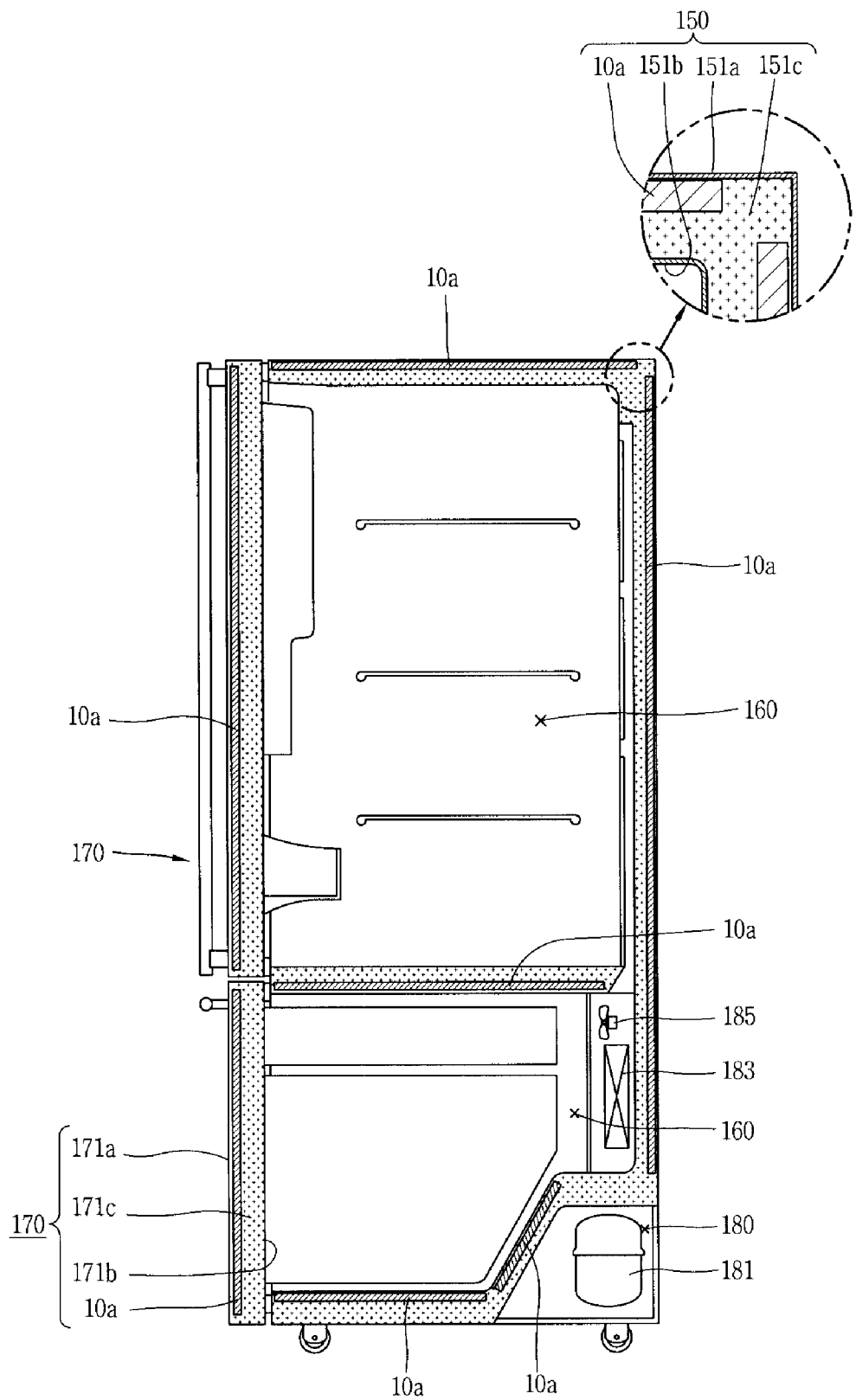
FIG. 11 is a sectional view of a refrigerating having a vacuum insulation member according to an exemplary embodiment of the present invention.

FIG. 11 is a sectional view of a refrigerating having a vacuum insulation member according to an exemplary embodiment of the present invention.

As shown in FIG. 11, a refrigerator having a vacuum insulation member may be configured to include a refrigerator main body 150 forming a cooling chamber therein, a door 170 for opening and closing the cooling chamber 160, and a vacuum insulation member 10a provided at the refrigerator main body 150 or the door 170. Here, the cooling chamber 160 is a general term for a freezing chamber and a refrigerating chamber, and the refrigerator main body 150 may be configured to include one of the freezing chamber and refrigerating chamber.

The vacuum insulation member 10a may be configured to include a core 20 having a certain shape and having a decompressed space therein, and a gas barrier layer 30 formed by coating a certain material on a surface of the core 20 to have impermeability. Here, the vacuum insulation member 10a may be configured to further include the filler 50 formed as powder having micro pores and accommodated in the interior of the core 20. Also, the vacuum insulation member 10a may be further include the getter 40 disposed at the inner side of the core 20 to absorb an internal gas component. Here, the vacuum insulation member 10a may be configured to have the configuration of the vacuum insulation members 10a, 10b, and 10c as described above with reference to FIGS. 1 to 10.

The refrigerator main body 150 includes an outer case 151a forming an external appearance and an inner case disposed to be spaced apart with a charging interval of an insulation member 151c at an inner side of the outer case 151a and forming the cooling chamber 160 therein.

The refrigerator main body 150 may include a refrigerating cycle for providing cooling air to the cooling chamber 160. A mechanic chamber 180 may be formed at a lower region of a rear side of the refrigerator main body 150. The mechanic chamber 180 may include a partial configuration of the refrigerating cycle including a compressor 181, a condenser, and the like, and an evaporator 183 may be provided at one side of the interior of the cooling chamber 160. A cooling fan 185 may be provided at one side of the evaporator 183.

The vacuum insulation member 10a may be provided on at least one side wall of the refrigerator main body 150. Thus, the thickness of the corresponding side wall can be reduced, and accordingly, the internal space of the refrigerator can be increased as much, with the same appearance (size) maintained, namely, without changing the size and shape of the outer case 171a.

The door 170 may include an outer door plate 171a forming an external appearance and an inner door plate 171b spaced apart with a charging interval of the insulation member 171c from the outer door plate 171a at an inner side of the outer door plate 171a.

The door 170 may include the vacuum insulation member 10a. The vacuum insulation member 10a may be provided between the outer door plate 171a and the inner door plate 171b. Accordingly, the thickness of the door 170 can be reduced.

Here, because the vacuum insulation member 10a is configured to include the core 20 formed as a structure having a certain shape and the gas barrier layer 30 formed on the surface of the core 20, the use of an envelope implemented as a film can be avoided. Thus, the problem that the lift span is shorted due to the damage to the vacuum degree resulting from a burst (damage) of the envelope can be solved.

Here, the vacuum insulation member 10a may be configured to have the core 20 formed as a structure having a certain shape and the gas barrier layer 30 formed on the surface of the core 20, so when the fabrication of the vacuum insulation member 10a is completed, the vacuum insulation member 10a can have a uniform thickness. Thus, because the uniform vacuum insulation thickness is secured, the thickness of the side wall of the refrigerator can be reduced as much. Namely, in the related art vacuum insulation member, it has a large thickness deviation, so the thickness of the blowing agent is set based on the smallest portion of the thickness of the vacuum insulation member, causing a problem in that the thickness of the side wall of the cooling chamber 160 increases overall. In comparison, however, according to the present exemplary embodiment, the vacuum insulation member 10a has a uniform thickness, so the side wall of the cooling chamber 160 can be formed to be thinner overall, and thus, the internal space of the refrigerator can be increased as much.

In addition, the vacuum insulation member 10a may be configured to have the core 20 formed as a structure having a certain shape and the gas barrier layer 30 formed on the surface of the core 20. Thus, a smooth outer surface can be obtained without creases because an envelope is not in use. Thus, when the vacuum insulation member 10a is bonded to an object, a defective bonding caused by a generated crease can be restrained.

In more detail, the vacuum insulation member 10a is disposed between the outer case 151a and the inner case 151b and fixed to one of the outer case 151a and the inner case 151b before a foaming operation of the refrigerator main body 150. When the vacuum insulation member 10a is fixed, the blowing agent (polyurethane, and the like) is injected between the outer case 151a and the inner case 151b.

The blowing agent injected into the interior between the outer case 151a and the inner case 151b expands while flowing within the internal space between the outer case 151a and the inner case 151b. IN this case, because there is little creases on the surface of envelope of the vacuum insulation member 10a, vacuum insulation member 10a can be completely tightly attached to the surface of the object (e.g., the outer case 151a or the inner case 151b). Accordingly, the blowing agent is prevented from being introduced to between the vacuum insulation member 10a and the object, restraining a generation of a defective bonding that the vacuum insulation member 10a is detached from the object. In comparison, in the related art vacuum insulation member, because creases are generated on the envelope, when the vacuum insulation member is attached to the surface of the object (the outer case 151a or the inner case 151b), a gap due to the creases is generated between the vacuum insulation member and the object and the blowing agent will be introduced through the gap so as to be expanded, causing the defective attachment problem in that the vacuum insulation member is separated from the surface of the object.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A vacuum insulation member comprising:
    a core having a shape and having a decompressed space therein; and
    a gas barrier layer formed by coating a material on both an inner surface and an outer surface of the core,
    wherein the core includes a body having a rectangular parallelepiped shape, which has an opening on one side and an empty space formed therein, and a cover to open and close the opening of the body,
    wherein a step portion is formed at an area where the body and the cover are in contact with each other, and
    wherein a seal is interposed between the step portion of the body and the step portion of the cover.

2. The vacuum insulation member of claim 1, wherein a vacuum degree of an interior of the core ranges from $10^{-5}$ Torr to $10^{-2}$ Torr.

3. The vacuum insulation member of claim 2, wherein the gas barrier layer is metal.

4. The vacuum insulation member of claim 1, further comprising: a filter formed as powder having micro pores and charged in an interior of the core.

5. The vacuum insulation member of claim 4, wherein a vacuum degree of an interior of the core may range from $10^{-1}$ Torr to 10 Torr.

6. The vacuum insulation member of claim 5, wherein the gas barrier layer is formed by a metal or inorganic material.

7. The vacuum insulation member of claim 6, wherein the inorganic material comprises at least one of silicon dioxide, titanium dioxide, and aluminum oxide.

8. The vacuum insulation member of claim 4, wherein the filter is configured to include at least one of silicon dioxide, titanium dioxide, and aluminum oxide.

9. The vacuum insulation member of claim 4, wherein the filter is configured to include at least one of aerogel and fumed silica.

10. The vacuum insulation member of claim 1, wherein the core has a rectangular parallelepiped shape.

11. The vacuum insulation member of claim 1, wherein a rib is provided to be disposed in a thickness wise direction of the core at the inner side of the core, and wherein the rib further comprises a transversely extending section forming a grid shape, ends of the rib contact with the inner surface of the core, and a through portion is formed on the rib so as to restrain heat transmission through the rib.

12. The vacuum insulation member of claim further comprising:
    the vacuum insulation member further comprises a getter disposed at an inner side of the core and configured to absorb an internal gas component through the through portion of the rib.

13. The vacuum insulation member of claim 1 further comprising:
    a getter coated on the surface of the core and configured to absorb a gas component.

14. A refrigerator comprising the vacuum insulation member of claim 1.

15. A method for fabricating a vacuum insulation member, the method comprising:
    forming a core having a shape and having a vacuum space therein;
    forming a gas barrier layer by coating a material on both an inner surface and an outer surface of the core; and decompressing the interior of the core to maintain a vacuum degree, wherein the core includes a body having a rectangular parallelepiped shape, which has an opening on one side and an empty space formed therein, and a cover for opening and closing the opening of the body, wherein a step portion is formed area where the body and the cover are in contact with each other; and wherein a seal is interposed between the step portion of the body and the step portion of the cover.

16. A method for fabricating a vacuum insulation member, the method comprising:

forming a core having a shape and having a vacuum space therein, the core includes a body having a rectangular parallelepiped shape, which has an opening on one side, and an empty space formed therein, and a cover to open and close the opening of the body;

forming a gas barrier layer by coating a material on both an inner surface and an outer surface of the core;

inserting a filler as powder having micro pores into the interior of the core; and decompressing the interior of the core to maintain a certain vacuum degree, a step portion is formed at an area where the body and the cover are in contact with each other, and a seal is interposed between the step portion of the body and the step portion of the cover.

* * * * *